(12) United States Patent
Ross

(10) Patent No.: US 11,498,551 B2
(45) Date of Patent: Nov. 15, 2022

(54) METHOD AND SYSTEM FOR OPERATING A VEHICLE

(71) Applicant: Robert Bosch GmbH, Stuttgart (DE)

(72) Inventor: Hans-Leo Ross, Lorsch (DE)

(73) Assignee: Robert Bosch GmbH, Stuttgart (DE)

( * ) Notice: Subject to any disclaimer, the term of this patent is extended or adjusted under 35 U.S.C. 154(b) by 330 days.

(21) Appl. No.: 16/755,318

(22) PCT Filed: Sep. 11, 2018

(86) PCT No.: PCT/EP2018/074475
§ 371 (c)(1),
(2) Date: Apr. 10, 2020

(87) PCT Pub. No.: WO2019/076542
PCT Pub. Date: Apr. 25, 2019

(65) Prior Publication Data
US 2021/0197799 A1 Jul. 1, 2021

(30) Foreign Application Priority Data
Oct. 16, 2017 (DE) .......................... 102017218438.8

(51) Int. Cl.
*B60W 30/06* (2006.01)
*G06K 9/62* (2022.01)
*G06V 20/58* (2022.01)

(52) U.S. Cl.
CPC ........... *B60W 30/06* (2013.01); *G06K 9/6288* (2013.01); *G06V 20/58* (2022.01); *B60W 2420/42* (2013.01); *B60W 2420/52* (2013.01)

(58) Field of Classification Search
CPC ...... B60W 30/06; G06V 20/58; G06K 9/6288
(Continued)

(56) References Cited

U.S. PATENT DOCUMENTS 7,786,898 B2 * 8/2010 Stein .................... G06V 10/143
340/436
10,040,482 B1 * 8/2018 Jung .................. B62D 15/0285
(Continued)

FOREIGN PATENT DOCUMENTS

| CN | 104802793 A | 7/2015 |
| JP | 2008304560 A | 12/2008 |

(Continued)

OTHER PUBLICATIONS

International Search Report for PCT/EP2018/074475, dated Apr. 5, 2019.
(Continued)

*Primary Examiner* — Russell Frejd
*Assistant Examiner* — Luke Huynh
(74) *Attorney, Agent, or Firm* — Norton Rose Fulbright US LLP; Gerard Messina

(57) ABSTRACT

A method for operating a vehicle having a sensor device including at least two technologically diversified sensor units. The method includes: detection of pieces of surroundings information with the aid of the sensor device; defined evaluation of the pieces of surroundings information detected by the technologically diversified sensor units with respect to plausibility; and defined usage of the pieces of surroundings information using a result of the defined evaluation of the detected pieces of surroundings information.

11 Claims, 3 Drawing Sheets

(58) Field of Classification Search
USPC .......................................................... 701/25
See application file for complete search history.

(56) References Cited

U.S. PATENT DOCUMENTS

| | | | |
|---|---|---|---|
| 2003/0151516 A1* | 8/2003 | Basir | G08B 21/06 600/300 |
| 2005/0228546 A1 | 10/2005 | Naik et al. | |
| 2008/0036576 A1 | 2/2008 | Stein et al. | |
| 2015/0073630 A1 | 3/2015 | Downs, Jr. et al. | |

FOREIGN PATENT DOCUMENTS

| | | | |
|---|---|---|---|
| JP | 2011510852 A | 4/2011 | |
| JP | 2011242860 A | 12/2011 | |
| JP | 2012118683 A | 6/2012 | |
| JP | 2012230604 A | 11/2012 | |
| JP | 2014137743 A | 7/2014 | |
| WO | 2010023242 A1 | 3/2010 | |

OTHER PUBLICATIONS

Puls Stephan et al., "Plausibility Verification for Situation Awareness in Safe Human-Robot Cooperation", The 23rd IEEE International Symposium on Robot and Human Interactive Communication, IEEE, 2014, pp. 601-606. XP032664712.

Ghahroudi M R et al., "A Hybrid Method in Driver and Multisensor Data Fusion, Using a Fuzzy Logic Supervisor for Vehicle Intelligence", Sensor Technologies and Applications, Sensorcomm 2007, International Conference on, IEEE, Piscataway, NJ, USA, 2007, pp. 393-398. XP031338549.

* cited by examiner

METHOD AND SYSTEM FOR OPERATING A VEHICLE

FIELD

The present invention relates to a method for operating a vehicle. The present invention furthermore relates to a system for operating a vehicle. The present invention furthermore relates to a computer program product.

BACKGROUND INFORMATION

Technical systems which take on tasks of humans not only have to at least equivalently execute visual, acoustic, manual, etc. skills of the human, but rather also have to be capable of at least equivalently compensating for, for example, possible error responses or measuring principle-specific irritations, adaptations to glare situations, shadow formation, etc.

Convenonal surroundings detection systems (environmental sensing) have many technical inadequacies and/or have limits in imaging reality in correct digital data and generally also have significant deficiencies with regard to external surroundings influences and infrastructure influences. In general, sensor systems based on radar, laser, camera, etc. are solely technical detection systems which are trained, calibrated, scaled, etc. and otherwise adapted to typical applications, for example, driving area recognition, object recognition, etc. only on the basis of empirical experiential structures.

Voting systems based on microprocessor units, which have been developed for special safety tasks, are conventional. Such systems are conventional, for example, in aeronautical technology, such architectures usually being implemented on the device level and being used for triple redundancy electronics.

Conventional safety systems are exclusively based on diagnoses and redundancies, which, in a comparator, release corresponding actuators or actuate them directly.

PCT Application No. WO 2010/23242 A1 describes a drive-by-wire system, which is equipped with majority decision makers, the majority decision makers using equations to generate an output signal. The system is provided for controlling vehicle components, in particular for steering a vehicle according to the drive-by-wire principle, which migrates to a fail-safe state in the case of a safety-critical error in one of its components.

U.S. Patent Appl. Pub. No. US 2015/0073630 A1 describes a controller for an electric motor in an electrically driven vehicle. The controller includes, inter alia, a voting control module and a bypass module, the voting control module receiving an error signal from one of the two other modules. As soon as both modules transmit an error signal, the voting control module generates a bypass command and relays it to the bypass module, which executes the command.

U.S. Patent Appl. Pub. No. US 2005/0228546 A1 describes an error-tolerant by-wire system for vehicles, which generates a clarified signal after error detection, controllers voting for a specific clarified signal.

SUMMARY

One object of the present invention is to provide an improved system for operating a vehicle.

The object may be achieved according to a first aspect of the present invention by an example method for operating a vehicle, a sensor device including at least two technologically diversified sensor units, including the steps:
- detection of pieces of surroundings information with the aid of the sensor device;
- defined evaluation of the pieces of surroundings information detected by the technologically diversified sensor units with respect to plausibility; and
- defined usage of the pieces of surroundings information using a result of the defined evaluation of the detected pieces of surroundings information.

In accordance with the present invention, a method is provided in this way, in which pieces of information are checked by the sensor for correctness and/or usability and used thereafter, the fact being utilized that a decision unit ("voter") operates in a logic-based manner and not empirically. The named voter is advantageously used at a point at which it is no longer directly involved with the actual sensor data. In general, in the case of three paths, there are two homogeneous paths (i.e., having identical functionality or systemic equality) and one diverse path. Random errors may thus be discovered well by the comparison of the homogeneity and systemic errors may be controlled or tolerated by the diversity.

According to a second aspect of the present invention, the object may be achieved by an example system for operating a vehicle, including:
- at least two technologically diversified sensor units for detecting pieces of surroundings information of the vehicle;
- an evaluation unit for the defined evaluation with respect to plausibility of the pieces of surroundings information detected by the technologically diversified sensor units; and
- a decision unit for the defined usage of the pieces of surroundings information using a result of the defined evaluation of the detected pieces of surroundings information.

Advantageous refinements of the method are described herein.

One advantageous refinement of the method according to the present invention provides that a driving area of the vehicle is detected and evaluated with the aid of the sensor device. In this way, it may advantageously be detected whether objects are located in the critical driving area of the vehicle, whereby a driving characteristic for the vehicle may be designed more safely.

One further advantageous refinement of the present invention provides that a plausibility check of a presence of an object in the surroundings of the vehicle is carried out. This thus assists a detection area in the surroundings of the vehicle being detected in an improved manner and thus a driving behavior of the vehicle being designed in an improved manner.

One further advantageous refinement of the method according to the present invention provides that the defined evaluation of the technologically diversified sensor units is carried out redundantly. A safety level for the system may thus be enhanced still further.

One further advantageous refinement of the method according to the present invention provides that the driving area is virtually partitioned in a geometric regard for the defined evaluation of the technologically diversified sensor units. In this way, a driving area in the surroundings of the vehicle may advantageously be divided according to suitable principles and adapted to specific requirements. An operating characteristic of the system may thus be enhanced still further.

One further advantageous refinement of the method according to the present invention provides that during the defined evaluation of the pieces of surroundings information detected by the technologically diversified sensor units with respect to plausibility, evaluation algorithms are processed in relation to one another in a defined manner. An efficient check of the data provided by the sensor units is thus assisted.

Further advantageous refinements of the method according to the present invention provide that the technologically diversified sensor units include a fuzzy logic, and/or nondeterministic systems and/or nondeterministic algorithms, and/or sporadically error-prone systems. Multiple variants for the design of the sensor units are thus advantageously possible.

The present invention is described in detail hereafter with further features and advantages on the basis of multiple figures. The figures are intended above all to illustrate the main aspect of the present invention and are not necessarily true to scale.

Described method features result similarly from corresponding described device features and vice versa. This means in particular that features, technical advantages, and embodiments relating to the method result similarly from corresponding embodiments, features, and advantages relating to the system and vice versa.

DETAILED DESCRIPTION OF EXAMPLE EMBODIMENTS

The term "automated vehicle" is used hereafter synonymously in the meanings of fully automated vehicle, semi-automated vehicle, fully autonomous vehicle, and semi-autonomous vehicle.

Figure 1:
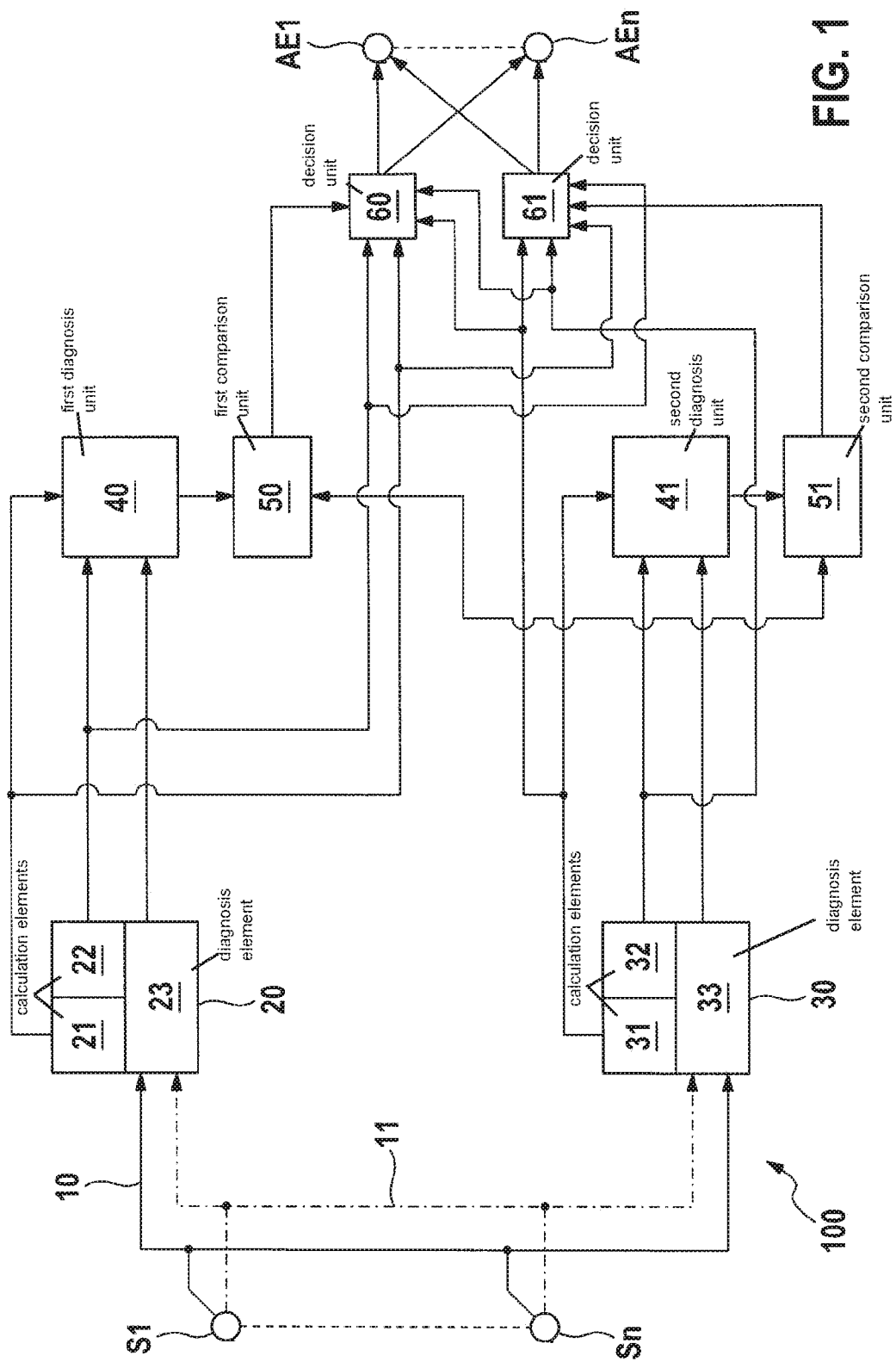
FIG. 1 shows an overview including a fundamental representation of a functionality of the method according to the present invention.

FIG. 1 shows an overview of one specific embodiment of a provided system 100 for operating a vehicle (not shown). To carry out the provided method, the vehicle may include a vehicle-bound surroundings detection system (onboard perception), for example, a video and/or LIDAR and/or radar and/or ultrasonic sensor system for detecting pieces of surroundings information of the vehicle. Furthermore, the named surroundings detection system may also be situated at least partially in an infrastructure in the surroundings of the vehicle.

Sensor units S1 . . . Sn are recognized, for example, in the form of radar, LIDAR, camera, etc. With the aid of a first data line 10, the data of the named sensor units S1 . . . Sn are supplied to a first logic unit 20. First logic unit 20 includes calculation elements 21, 22 and a diagnosis element 23 for processing the supplied data. The named data of sensor units S1 . . . Sn are supplied to a second logic unit 30 via a second data line 11, second logic unit 30 including calculation elements 31, 32 and a diagnosis element 33 for processing the supplied data.

The data are supplied from the named first logic unit 20 to a first diagnosis unit 40 which is functionally connected to a first comparison unit 50. The data of sensor units S1 . . . Sn are checked, for example, for plausibility with aid of diagnosis unit 40. First comparison unit 50 is functionally connected to a second comparison unit 51, first comparison unit 50 implementing functions which compare results of the two redundant paths and thus implementing a cross comparison with a second comparison unit 51 before the input of first decision unit 60. As a result, first decision unit 60 solely takes over a corresponding actuation of actuators AE1 . . . AEn.

The processing of the data of sensor units S1 . . . Sn, which are read out with the aid of second data line 11, is carried out similarly as explained above with the aid of second logic unit 30, second diagnosis unit 41, and second comparison unit 51.

It may thus be inferred that decision units 60, 61 are situated at the end of the chain of the signal processing and in this way a check, evaluation, and analysis of the sensor data with respect to plausibility are carried out. In this way, decision units 60, 61 in system 100 are no longer involved with processing of the "real" sensor data. As a result, an accuracy of the sensor data is largely precluded, whereby assistance systems of the vehicle activated by system 100 may operate more reliably.

The selection with respect to checking the sensor data for correctness is carried out with the aid of logic structure including logic units 20, 30, diagnosis units 40, 41, and comparison units 50, 51.

The two technologically diversified sensor units may also be designed as two different algorithms based on neuronal networks, and/or as a fuzzy logic, and/or as nondeterministic systems, and/or as sporadically error-prone systems.

In this way, the sensor data of sensor units S1 . . . Sn may be efficiently checked with the aid of system 100, whereby an accuracy of entire system 100 is advantageously assisted. As a result, an automated vehicle activated using system 100 may thus be operated more safely.

As a result, a redundant 2-of-4 voter is implemented using system 100 of FIG. 1, defined conditions, diagnoses, integrities, and states being used as the input for the voter configuration. If, for example, a sensor unit S1 . . . Sn designed as a camera detects gray asphalt, the conclusion is drawn therefrom that an obstacle is not present between the road and the vehicle. A diverse approach according to the related art in this case would be that it is detected that no objects are present in the driving area of the vehicle.

It may thus be inferred that in provided system 100, data of the entire sensor system are read in largely independently of one another into redundant evaluation systems. In this way, random hardware errors and/or also systematic errors of the sensor system may be largely precluded, since a simultaneity of the named errors may be used as a criterion for the improbability. For example, an EMC problem does not act simultaneously on two different signals having the same effect at the same time.

The sensor fusion and also the acquisition of information, for example, by evaluation algorithms (object tracking, image recognition, neuronal networks, models, simulations, indirect measurements, etc.) are designed redundantly on physically differing electronic/electrical systems in this way, random hardware errors advantageously being discovered by a comparison of results of the redundancy and not being adopted in the evaluation activity of system 100.

If system 100 is supposed to have reliable requirements relating to availability (for example, steering in the case of highly automated driving), the actuation of actuators AE1 . . . AEn is preferably to take place via redundant decision units 60, 61, which carry out a synchronization and simultaneity analysis. It is important that the redundant sections do not experience influence up to decision units 60, 61, so that errors along the process chain do not result in the so-called undesired common cause effects.

Figure 2:
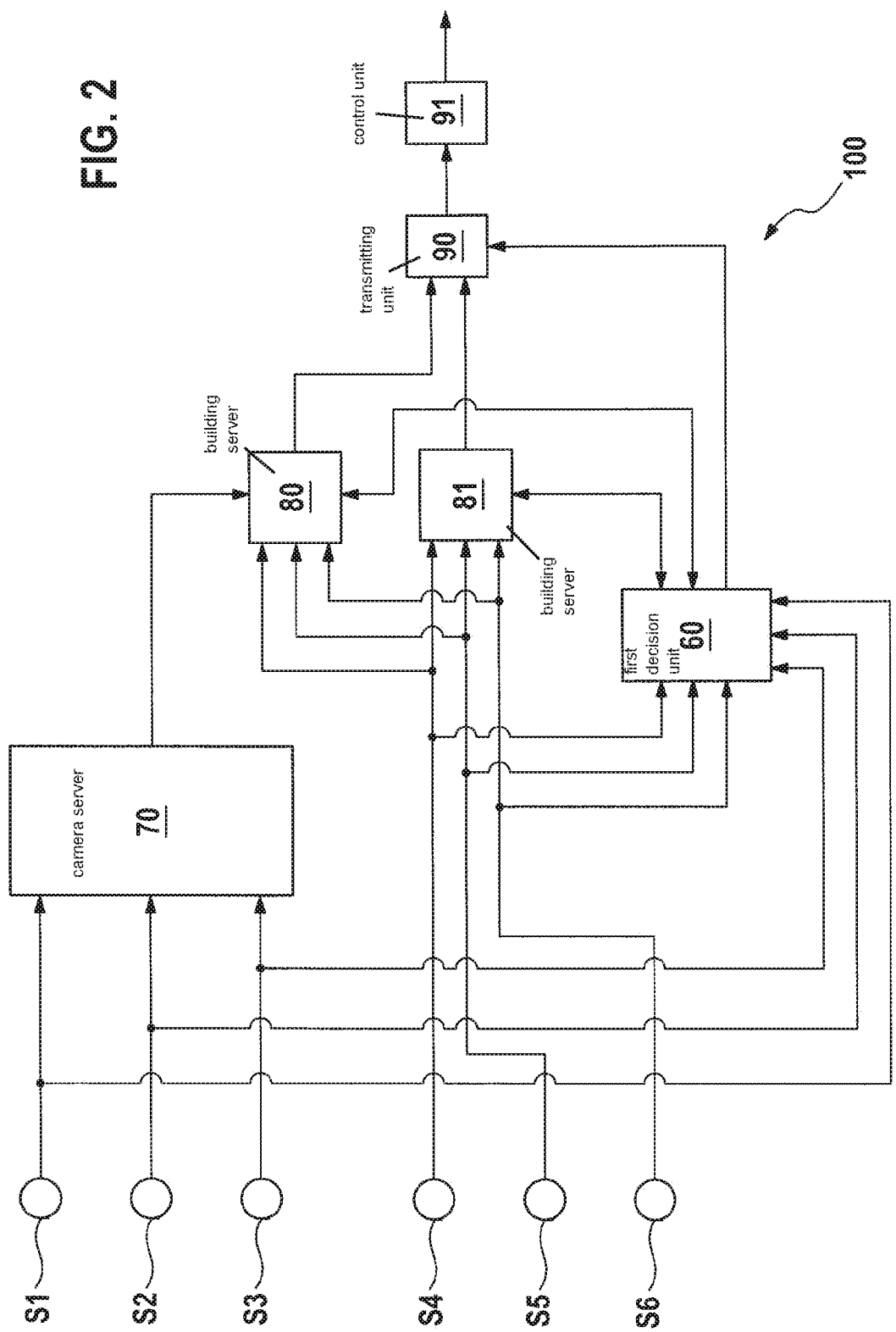
FIG. 2 shows a fundamental representation of one specific embodiment of a provided system for operating a vehicle.

FIG. 2 shows solely by way of example one technical implementation option for system 100 shown in FIG. 1.

Sensor units S1 through S3 in the form of cameras and sensor units S4 through S6 in the form of LIDAR sensors are recognizable. Sensor device S1 . . . Sn thus includes at least two technologically diversified sensor units. Sensor units S1 . . . S3 transmit their data to a camera server 70 and to first decision unit 60. Sensor units S4 . . . S6 transmit their data to building servers 80, 81, situated in a parking garage, for example, and to first decision unit 60. Building servers 80, 81 implement the functionalities of logic units 20, 30, diagnosis units 40, 41, and comparison units 50, 51 shown in FIG. 1.

During the defined evaluation of the pieces of surroundings information detected by the technologically diversified sensor units with respect to plausibility, evaluation algorithms may be processed in relation to one another in a defined manner, whereby a double check of plausibilities of sensor data is enabled.

Building servers 80, 81 evaluate the data of camera server 70 and sensor units S4 . . . S6 and transmit their result data to a transmitting unit 90. Transmitting unit 90 receives a release signal in the form of a valid key from first decision unit 60, whereupon transmitting unit 90 relays the data to a control unit 91. Transmitting unit 90 may be functionally connected to control unit 91, for example, via a wireless connection (for example, radio connection).

It is thus possible with the aid of decision unit 60 to release or block the data streams of transmitting unit 90 in a defined manner. Decision unit 60 is only still partially participating in the processing of the pieces of data information of the sensor units and has, for example, no knowledge about the pieces of image information of sensor units S1 . . . S3.

Control unit 91 thus functions as a result as a type of dead man switch, which remains active when a valid key is transmitted from decision unit 60 to transmitting unit 90. This may take place, for example, at defined time intervals (for example, every 100 ms), in the case of a nontransmission of the key, the vehicle being put into a safe state with the aid of control unit 91 via actuators AE1 . . . AEn, for example, decelerated and/or steered in a defined manner.

As a result, a conditional voter is implemented using system 100 of FIG. 1 and FIG. 2, which is configured in a defined manner to evaluate various data streams on the basis of greatly varying parameters and thus be able to safely actuate actuators AE1 . . . AEn on the basis of different factors.

Such factors may be dependent on defined states, for example:
  operating states of the vehicle (for example, vehicle accelerates, decelerates, etc.)
  system states (for example, control units are in an initialization phase, reconfiguration, defective, etc.)
  traffic situations (for example, expressway travel, busy street, urban surroundings, etc.).

In particular, in the case of the surroundings sensor system, the systems may be switched over to better systems or evaluation algorithms in the event of possible technical deficiencies. Therefore, in addition to the technical deficiencies of the sensors and evaluation algorithms, possible error effects from the surroundings are also adaptable, for example:
  temperature, dirt, etc. corrupt the measuring results
  rain, snow, fog, etc. restrict the detection capacity
  electrical errors and tolerances (for example, component noise, EMC, etc.) corrupt the result of the sensor data.

The technical systems may be calibrated or configured in a chronologically variable manner, so that the voter suppresses the results of these technical elements for the period.

The detection algorithms (in the case of LIDAR based on a mechanical rotation of the emitter), compensation algorithms, etc. may thus be adapted to the different data propagation times of the systems.

In a further variant, a prioritized voting may also be carried out, in this case a sensor unit which is best suited for the particular situation, state, etc. is given higher priority and the pieces of information having the highest priority are considered in the voter. It is thus possible to operate very well using fuzzy logic (for example, neuronal networks) or nondeterministic measuring principles. This is a significant advantage for securing neuronal networks.

One advantage of provided system 100 is that the safety verification is no longer based on the error integrity of the carrier system (including sensors), but rather only on a possible influence on the safety of the vehicle. Only the diagnosis, comparator, and the voter as well as the actuator actuation are thus implemented according to safety requirements. The diverse functions are only subject to the analysis for errors of common cause and are no longer necessary in traffic as an implemented safety mechanism.

It is thus also possible to deal with unusual influences, since they are detected as unusual (there are combinatorics which are not logical) and, for example, the vehicle is degraded accordingly (for example, decelerated, guided to a different route, etc.).

Figure 3:
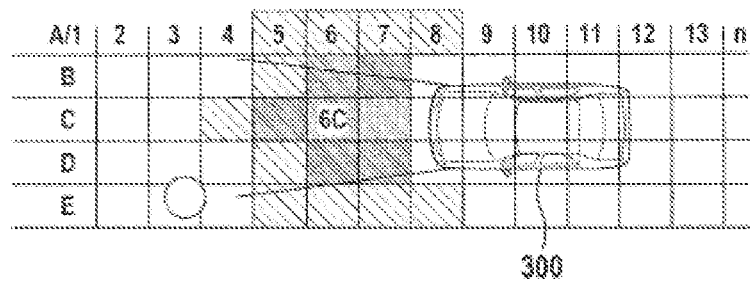
FIG. 3 shows a representation of a functionality of one specific embodiment of the provided system.

FIG. 3 shows a representation of a functionality of the provided method in AVP (automated valet parking) surroundings, in which an automated vehicle 300 is externally guided in a parking area. It is recognizable that a driving area ahead of vehicle 300 is divided into virtual geometric areas in the form of squares. A square 6C is indicated, which is recognized as freely accessible with the aid of provided system 100. As a result, a scaling of the voter structure to a virtual area is implemented, which corresponds to a chessboard.

In particular, advantages of the provided method come to bear in the case of automated driving functions in general road traffic, because the complexity of surroundings, inadequacies, errors, states, etc. is much greater here than in the AVP surroundings.

An expansion of the chessboard analysis of FIG. 3 which is not shown in the figures may provide that a piece of height information of the area ahead of vehicle 300 is also considered, whereby further plausible data are generated and even more accurate decisions may be achieved with the aid of the decision units, which are generated in consideration of the pieces of height information.

It may be provided, for example, that the virtual area in the surroundings of vehicle 300 is divided into three height levels. In this way, area 6C is again recognized as freely accessible with the aid of system 100; in this case one LIDAR sensor may be situated in each of three different height levels on vehicle 300 and detects an accessible area ahead of vehicle 300. For better clarity, the individual units and elements of system 100 are not shown in FIG. 3.

Figure 4:
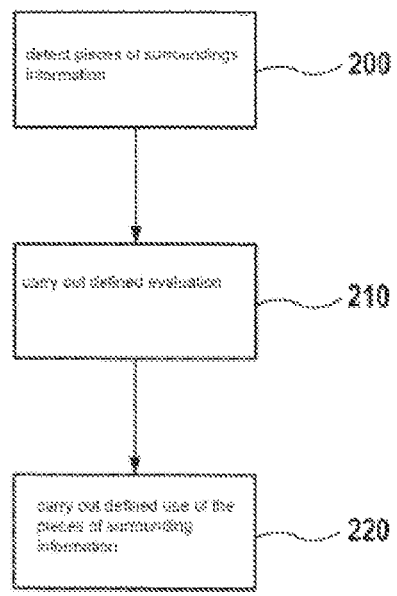
FIG. 4 shows a fundamental representation of a provided method for operating a vehicle.

FIG. 4 shows a fundamental sequence of one specific embodiment of the provided method.

In a step 200, a detection of pieces of surroundings information is carried out with the aid of sensor device S1 . . . Sn.

In a step 210, a defined evaluation of the pieces of surroundings information detected by the technologically diversified sensor units with respect to plausibility is carried out.

In a step 220, a defined use of the pieces of surroundings information is carried out using a result of the defined evaluation of the detected pieces of surroundings information.

The provided method may advantageously be used for an HAF (highly automated driving) level 5 operation of the vehicle, in which the driver no longer intervenes in the driving process.

The provided method may advantageously be implemented in the form of a software program having suitable program code means, which runs on system 100 for operating a vehicle. A simple adaptability of the method is possible in this way.

Those skilled in the art will modify the features of the present invention in a suitable way and/or combine them with one another, without departing from the core of the present invention.

What is claimed is:

1. A method for operating a vehicle, the vehicle having a sensor device including at least two technologically diversified sensor units, the method comprising the following steps:
   detecting of pieces of surroundings information using the sensor device including the at least two technologically diversified sensor units;
   performing a defined evaluation of the pieces of surroundings information detected by the technologically diversified sensor units with respect to plausibility; and
   performing a defined usage of the pieces of surroundings information using a result of the defined evaluation of the detected pieces of surroundings information,
   wherein a conditional voter is configured in a defined manner to evaluate a plurality of data streams, each data stream of the plurality of data streams associated with an operating state of the vehicle, a system state, and/or a traffic situation.

2. The method as recited in claim 1, wherein a driving area of the vehicle is detected in the detecting step and evaluated using the sensor device in the defined evaluation.

3. The method as recited in claim 1, wherein a plausibility check of a presence of an object in surroundings of the vehicle is carried out.

4. The method as recited in claim 1, wherein the defined evaluation of the technologically diversified sensor units is carried out redundantly.

5. The method as recited in claim 2, wherein the driving area is virtually partitioned in a geometric aspect for the defined evaluation of the technologically diversified sensor units.

6. The method as recited in claim 1, wherein during the defined evaluation of the pieces of surroundings information detected by the technologically diversified sensor units with respect to plausibility, evaluation algorithms are processed in relation to one another in a defined manner.

7. The method as recited in claim 1, wherein the technologically diversified sensor units include a fuzzy logic, and/or nondeterministic systems, and/or nondeterministic algorithms, and/or sporadically error-prone systems.

8. The method as recited in claim 1, wherein the performing of the defined usage includes using the pieces of surroundings information during an automated parking of the vehicle.

9. The method as recited in claim 1, wherein the performing of the defined usage includes using the pieces of surroundings information in urban surroundings.

10. A system for operating a vehicle, comprising:
    at least two technologically diversified sensor units configured to detect pieces of surroundings information of the vehicle;
    an evaluation unit configured to perform a defined evaluation of the pieces of surroundings information detected by the technologically diversified sensor units with respect to plausibility; and
    a decision unit configured to perform a defined usage of the pieces of surroundings information using a result of the defined evaluation of the detected pieces of surroundings information,
    wherein a conditional voter is configured in a defined manner to evaluate a plurality of data streams, each data stream of the plurality of data streams associated with an operating state of the vehicle, a system state, and/or a traffic situation.

11. A non-transitory computer-readable data carrier on which is stored a computer program including program code for operating a vehicle, the vehicle having a sensor device including at least two technologically diversified sensor units, the computer program, when executed by a computer, causing the computer to perform the following steps:
    detecting of pieces of surroundings information with using the sensor device including the at least two technologically diversified sensor units;
    performing a defined evaluation of the pieces of surroundings information detected by the technologically diversified sensor units with respect to plausibility; and
    performing a defined usage of the pieces of surroundings information using a result of the defined evaluation of the detected pieces of surroundings information,
    wherein a conditional voter is configured in a defined manner to evaluate a plurality of data streams, each data stream of the plurality of data streams associated with an operating state of the vehicle, a system state, and/or a traffic situation.

* * * * *